US012644979B2

(12) United States Patent
Flores Tapia

(10) Patent No.: US 12,644,979 B2
(45) Date of Patent: Jun. 2, 2026

(54) ADAPTIVE RADAR WAVEFORM REPEATER

(71) Applicant: GM Cruise Holdings LLC, San Francisco, CA (US)

(72) Inventor: Daniel Flores Tapia, Fairfield, CA (US)

(73) Assignee: GM CRUISE HOLDINGS LLC, San Francisco, CA (US)

( * ) Notice: Subject to any disclaimer, the term of this patent is extended or adjusted under 35 U.S.C. 154(b) by 376 days.

(21) Appl. No.: 18/156,335

(22) Filed: Jan. 18, 2023

(65) Prior Publication Data

US 2024/0241245 A1 Jul. 18, 2024

(51) Int. Cl.
G01S 13/92 (2006.01)
G01S 13/76 (2006.01)
(52) U.S. Cl.
CPC ............ G01S 13/765 (2013.01); G01S 13/92 (2013.01)
(58) Field of Classification Search
CPC .................. G01S 13/765; G01S 13/92; G01S 2013/9316; G01S 13/751; G01S 13/91; G01S 2013/9329; G01S 13/931
See application file for complete search history.

(56) References Cited

U.S. PATENT DOCUMENTS

| | | | | |
|---|---|---|---|---|
| 7,295,925 B2 * | 11/2007 | Breed | .............. | G08G 1/096783 |
| | | | | 340/436 |
| 11,550,027 B2 * | 1/2023 | Laghezza | .............. | G01S 13/343 |
| 2014/0225761 A1 * | 8/2014 | Garrec | .................. | G01S 13/872 |
| | | | | 342/51 |
| 2019/0392712 A1 * | 12/2019 | Ran | ...................... | G08G 1/0116 |
| 2021/0407306 A1 * | 12/2021 | Nielsen | ................... | G01W 1/02 |

* cited by examiner

*Primary Examiner* — Robert W Hodge
*Assistant Examiner* — Bongani Jabulani Mashele
(74) *Attorney, Agent, or Firm* — CANTOR COLBURN LLP

(57) ABSTRACT

Systems and techniques of the present disclosure may allow traffic control indicators, such as road signs or signals along a roadway to send information to a radar device at an autonomous vehicle (AV). A traffic control indicator may receive a radio signal sent from the radar device at the AV. A radar apparatus at the traffic control indicator may add information that simulates movement of the traffic control indicator and message data to an updated radar signal. The updated radar signal may then be sent from the traffic control indicator radar apparatus to the AV radar device. The AV radar device may then extract the message data from the updated radar signal based on updated radar signal including the movement information. A controller that controls the AV may then control the AV to drive according to the message data extracted from the updated radar signal.

20 Claims, 6 Drawing Sheets

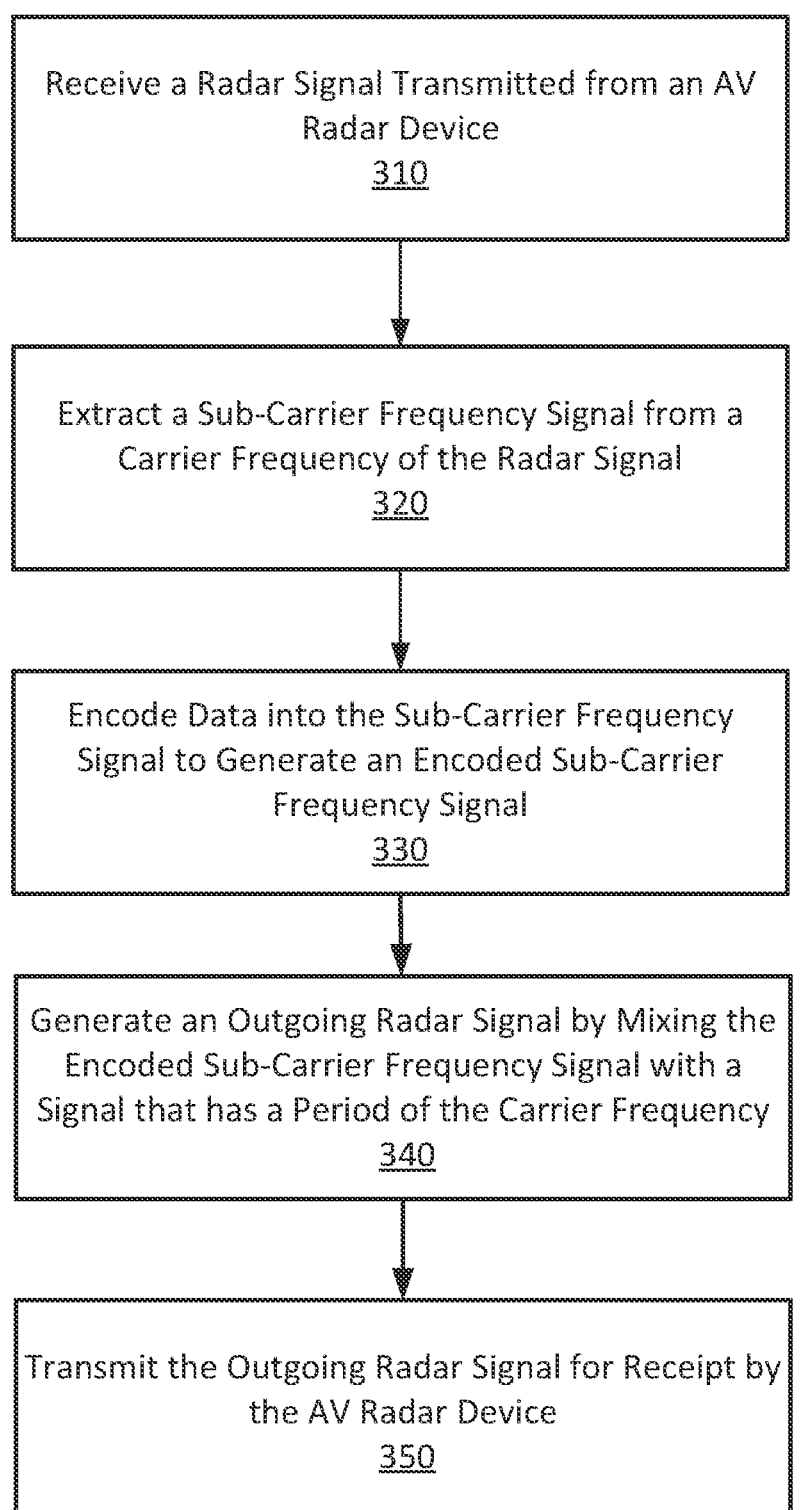

Receive a Radar Signal Transmitted from an AV Radar Device
310

Extract a Sub-Carrier Frequency Signal from a Carrier Frequency of the Radar Signal
320

Encode Data into the Sub-Carrier Frequency Signal to Generate an Encoded Sub-Carrier Frequency Signal
330

Generate an Outgoing Radar Signal by Mixing the Encoded Sub-Carrier Frequency Signal with a Signal that has a Period of the Carrier Frequency
340

Transmit the Outgoing Radar Signal for Receipt by the AV Radar Device
350

FIG. 3

ADAPTIVE RADAR WAVEFORM REPEATER

TECHNICAL FIELD

The present disclosure generally provides solutions for transmitting information to autonomous vehicles (AVs) and more specifically, for providing traffic control indicator information to an AV using modified Radio Detection and Ranging (RADAR) signals.

BACKGROUND

An autonomous vehicle (AV) is a motorized vehicle that can navigate without a human driver. An exemplary AV can include various sensors, such as a camera sensor, a Light Detection and Ranging (LIDAR) sensor, and a Radio Detection and Ranging (RADAR) sensor, amongst others. The sensors collect data and measurements that the AV can use for operations such as navigation. The sensors can provide the data and measurements to an internal computing system of the AV, which can use the data and measurements to control a mechanical system of the AV, such as a vehicle propulsion system, a braking system, or a steering system. Typically, the sensors are mounted at specific locations on the autonomous vehicles. Such sensors, however, have no ability to receive information from traffic control indicators (e.g., road signs or traffic signals) that may be located on or near a roadway.

BRIEF DESCRIPTION OF THE DRAWINGS

Illustrative examples of the present application are described in detail below with reference to the following figures:

FIG. 3 illustrates an example process for receiving one or more radar signals from and AV and for updating the received radar signals for rebroadcast, according to some aspects of the disclosed technology.

DETAILED DESCRIPTION

Figure 1:
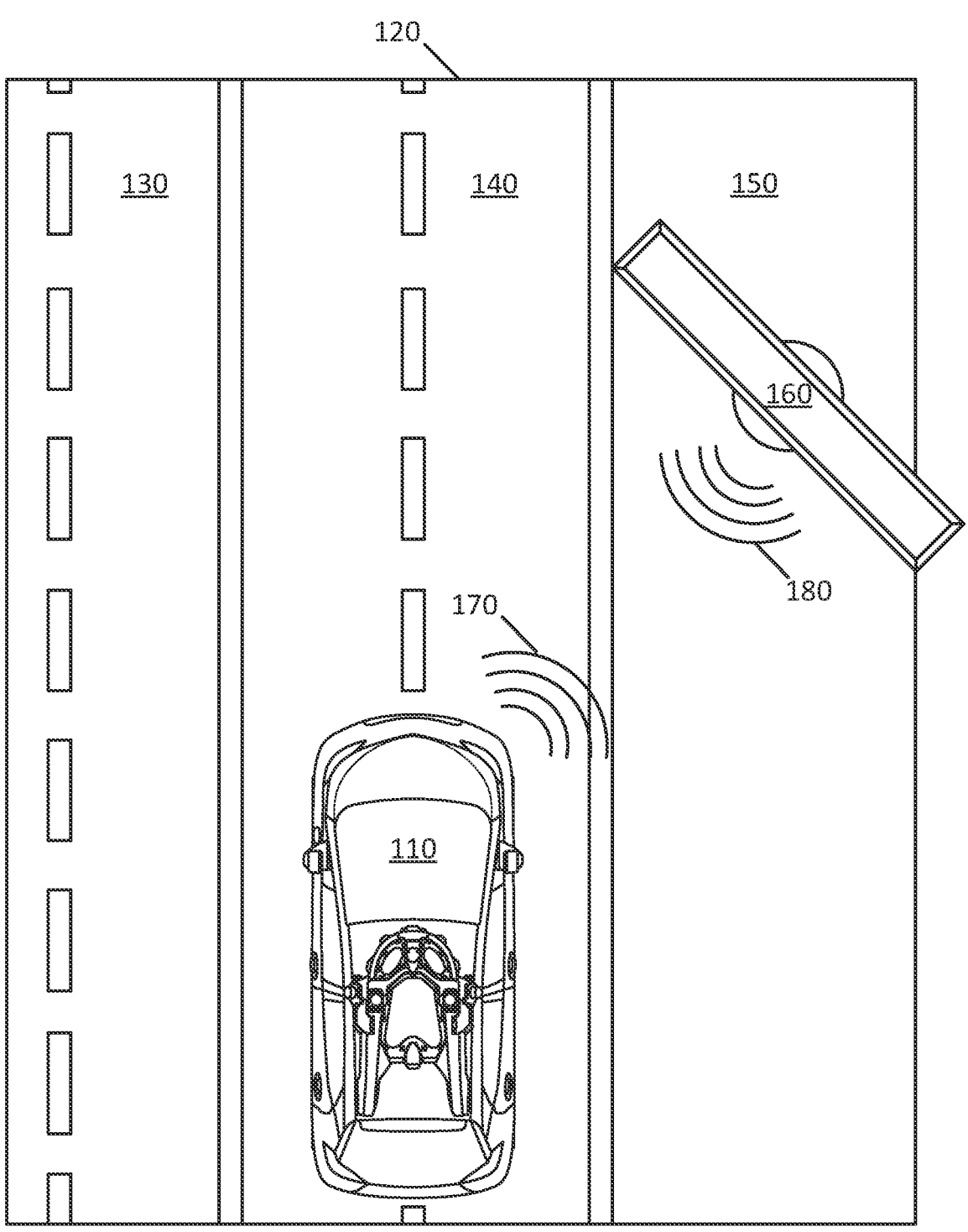
FIG. 1 illustrates a roadway environment in which an autonomous vehicle (AV) may receive radar signals from a traffic control indicator, according to some aspects of the disclosed technology.

The detailed description set forth below is intended as a description of various configurations of the subject technology and is not intended to represent the only configurations in which the subject technology can be practiced. The appended drawings are incorporated herein and constitute a part of the detailed description. The detailed description includes specific details for the purpose of providing a more thorough understanding of the subject technology. However, it will be clear and apparent that the subject technology is not limited to the specific details set forth herein and may be practiced without these details. In some instances, structures and components are shown in block diagram form in order to avoid obscuring the concepts of the subject technology.

Some aspects of the present technology may include the gathering and use of data available from various sources to improve safety, quality and experience. The present disclosure contemplates that in some instances, this gathered data may include personal information. The present disclosure contemplates that the entities involved with such personal information respect and value privacy policies and practices.

Autonomous vehicles (AVs) often make use of radar sensors to facilitate in the detection and tracking of moving objects in a surrounding environment. One limitation in the use of radar sensors is that radar systems typically filter out (or do not detect) stationary objects. In most applications, stationary objects can be safely detected and identified using other sensor modalities (such as LiDAR or camera sensors). However, in some applications it would be advantageous to enable radar detection of certain stationary objects, such as traffic control indicators that are often placed on, or in proximity to, driveable roadways, lanes, and/or lane segments. Additionally, many traffic control indicators, such as construction signs, traffic control signs, traffic signals, and/or emergency road signs may convey information that could be useful for AV planning and control operations. For example, information about roadway or lane closures, and/or dangerous road conditions that may be useful for improving AV safety and navigation.

Aspects of the disclosed technology provide solutions for enabling radar detection of stationary traffic control indicators and for receiving traffic control indicator information. In some aspects, the apparatus of the present disclosure include a radar enabled traffic control indicator that is configured to receive radar signals, such as radar signals transmitted by vehicle radar systems or radar apparatus used in AV applications. Once received by the traffic control indicator, the radar signals can be modified and rebroadcast (e.g., back to the signal source) to indicate the presence of the traffic control indicator and/or to indicate information associated with a weather condition, an emergency condition, road conditions, or other information that may be relevant to passing vehicles. It is understood that the information encoded in return radar signals transmitted by the traffic control indicator is not limited to a particular content type and may be dependent upon the desired implementation.

In some aspects, a radar enabled traffic control indicator can be configured to receive and manipulate radar signals received from a radar source, such as a radar sensor operated on an AV. A radar signal sent by the AV may be received by a radar apparatus at a traffic control indicator, and updated to include a velocity component, before a return/updated signal is transmitted back to the traffic control indicator. In some aspects, the velocity component can emulate signaling that would be received by a moving object, thereby making the existence/location of the traffic control indicator recognizable to the AVs radar sensor system. As discussed above, the updated (return) radar signal may include information (e.g., message data) about road conditions or other information (e.g., weather conditions) regarding a roadway along which an AV is driving. In some instances, the traffic control indicator may also display information that is readable by human drivers and in certain instances, the message data included in the updated radar signal may include the information displayed on the traffic control indicator.

For example, the traffic control indicator could include displays that provide warnings or emergency information to drivers using illuminated text. Such indicators may be electronic signage that include or display programmable text. In a set of examples, text displayed on such indicators may inform drivers that a lane of a roadway closes at some future distance (e.g., in one hundred feet), may inform drivers to turn around because of a lane closure, may inform drivers of a reduced speed limit, and/or may inform drivers that tire chains or four-wheel-drive must be used to continue driving alone the roadway. Because of this, an AV may be informed of the same road conditions that drivers can read on the sign.

Electronic components of the traffic control indicator may manipulate received signals such that those signals are evaluated by AV radar devices. These electronic components may add the aforementioned velocity component and may add other data that informs the AV of conditions along the roadway. Because of this, apparatus of the present disclosure that may act to inform an AV of road conditions or restrictions while also informing human drivers of those same road conditions or restrictions.

FIG. 1 illustrates a roadway environment in which an autonomous vehicle (AV) may receive radar signals from a traffic control indicator, according to some aspects of the disclosed technology. FIG. 1 includes AV 110 that is driving along roadway 120 in proximity to traffic control indicator 160. As illustrated in the example of FIG. 1, traffic control indicator 160 is located adjacent to a drivable lane 140, e.g., on road shoulder 150; however, in other examples, traffic control indicator 160 may be located in or on at least a portion of a drivable lane, such as lane 130 or 140.

Signs or other traffic control indicators located along a roadway are typically stationary objects that provide human drivers with information about the roadway, instructions regarding roadway driving conditions, or rules governing use of the roadway. Stationary objects along a roadway are objects that do not move relative to the roadway. As discussed above, data as well as the velocity component may be added to the updated radar signal, for example, to make the existence/location of the traffic control indicator 160 detectable to one or more radar systems of AV 110. For example, the velocity component included in the updated radar signal can cause the AV's radar sensor(s) to parse the updated radar signal for data. The velocity component is thus a false indication of movement. Because of this, systems and techniques of the present disclosure relate to a new type of traffic control indicator that can provide data to an AV using radar signals in a way that fools the AV radar device to perform evaluations that otherwise would not be performed.

While AV 110 is driving down roadway 120 in lane 140, a radar device at AV 110 transmits radar signal 170 that is received at a radar apparatus located at traffic control indicator 160. The radar apparatus located at traffic control indicator 160 may then generate updated radar signal 180 by adding the aforementioned velocity component. The radar apparatus at the traffic control indicator 160 may also add message information to radar signal 170 when updated radar signal 180 is generated. Updated radar signal 180 may be identical to the radar signal 170 except updated radar signal 180 may have been modified to include encoded data that was not included in radar signal 170. This data may have been encoded into radar signal 180 by inducing changes in phase to portions of radar signal 170. These phase changes may have been added using electronic circuits that perform a form of frequency or phase modulation on signals. Updated radar signal 180 may include phase shifts that a radar device at an AV will interpret as being associated with a moving object. The presence of this velocity component may force an AV radar device that receives radar signal 180 to perform evaluations on radar signal 180 that otherwise might not be performed. This is because, radar devices at AVs are not configured to evaluate radar signals received from stationary objects for ancillary data (e.g., message data).

Data encoded into radar signal 180 by the radar apparatus at traffic control indicator 160 may include message data that may identify road conditions along roadway 120. Such message data included in radar signal 180 may provide a same message that is provided to human drivers using text displayed on traffic control indicator 160. For example, data encoded in radar signal 180 may inform an AV 110 of a reduced speed limit along roadway 120 while the traffic control indicator 160 also displays text notifying human drivers of the reduced speed limit. The velocity component included in radar signal 180 ensures that an AV radar device will evaluate radar signal 180.

Radar signals 170 and 180 may be radar signals that include a carrier frequency and a sub-carrier frequency. In such an instance, the carrier frequency may be a higher frequency than the sub-carrier frequency. The carrier frequency may be a frequency that is within the radar spectrum of frequencies and the sub-carrier frequency may be within the radio spectrum of frequencies. For example, the carrier frequency may be a frequency of 77 gigahertz (GHz) and the sub-carrier frequency may be a frequency of 10 megahertz (MHz). As such, radar signals 170 and 180 could include a 10 MHz signal superimposed on or within a 77 GHz signal. A circuit that removes a lower frequency sub-carrier signal (e.g., the 10 MHz signal) from a higher frequency carrier frequency (e.g., the 77 GHz signal) may be referred to as a downmixing circuit because this circuit separates a lower frequency signal from a relatively higher frequency signal.

Once radar signal 170 is received by the radar apparatus at traffic control indicator 160, the 10 MHz sub-carrier frequency signal may be removed from the 77 GHz carrier frequency signal included radar signal 170. Electronic components of the radar apparatus at traffic control indicator 160 may then add a velocity component and possibly message data to the 10 MHz signal by changing phase relationships of the 10 MHz signal when an updated 10 MHz signal is generated. This updated 10 MHz signal may then be mixed with a 77 GHz signal received from an oscillator circuit at traffic control indicator 160 when radar signal 180 is generated. After or as radar signal 180 is generated, it may be transmitted for receipt by the radar device at AV 110. A circuit that mixes the updated 10 MHz signal with the oscillator 77 GHz signal may be referred to as an up-mixing circuit because it combines a relatively lower frequency signal with a relatively higher frequency signal.

Once radar signal 180 is received by the radar device at AV 110, the AV 110 radar device may separate the 10 MHz sub-carrier signal from the 77 GHz carrier signal, and the velocity component data encoded into the 10 MHz sub-carrier signal may force the AV 110 radar device to evaluate data included in that updated 10 MHz sub-carrier signal. This may result in message data being extracted from the 10 MHz carrier signal such that AV 110 may evaluate and/or act upon that message data. For example, the AV 110 may reduce speed to adhere to a speed limit included in message data or perform other tasks identified by the message data.

Figure 2:
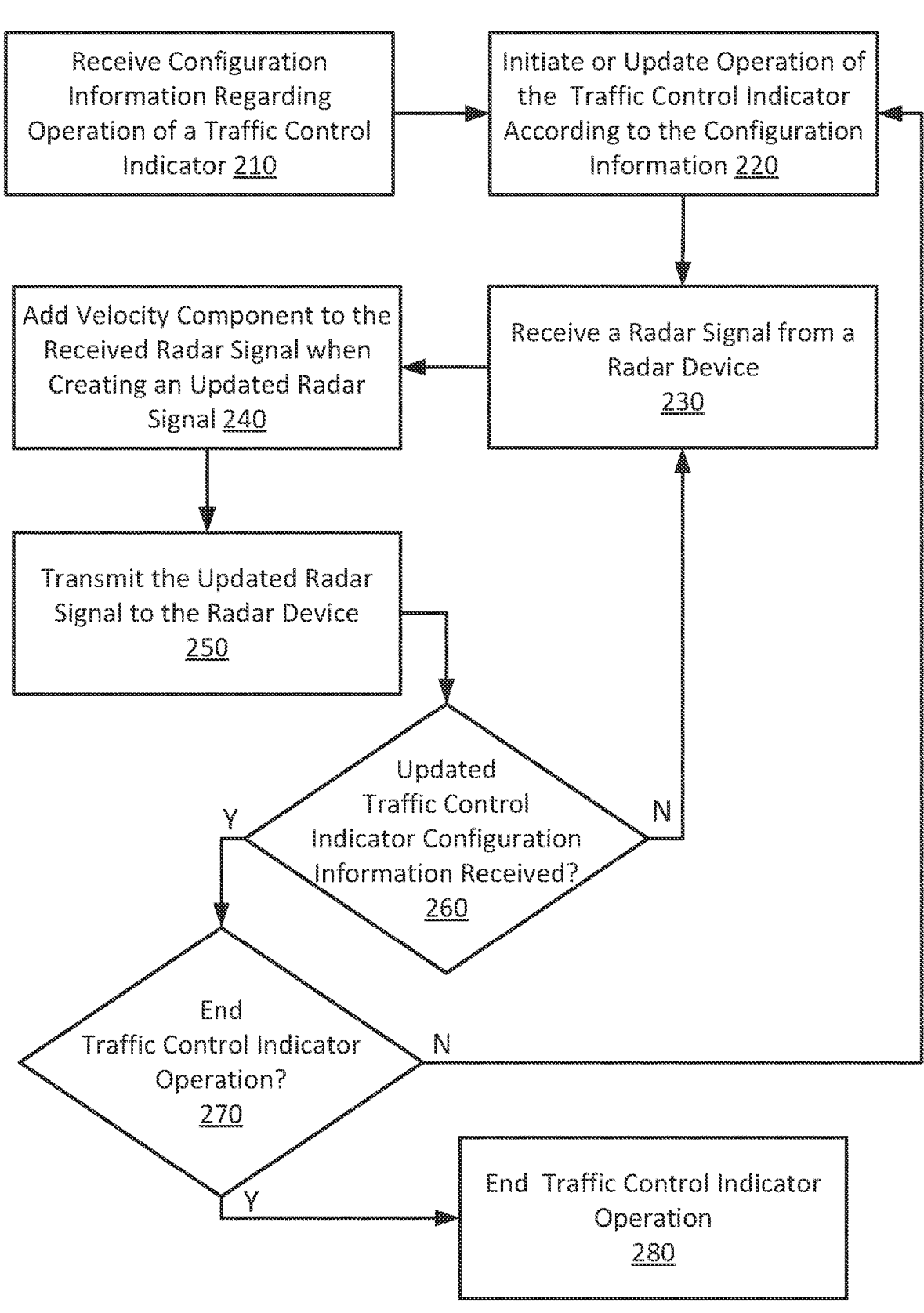
FIG. 2 illustrates an example process by which an AV can receive signaling information from a traffic control indicator system, according to some aspects of the disclosed technology.

FIG. 2 illustrates an example process that receives, updates, and transmits radar signals from electronics of a roadway sign. At block 210 a communication may be received at control electronics of a traffic control indicator. This control information may be received via a user interface at the traffic control indicator or may be received from another computing device via a communication interface. For example, data that configures operation of the traffic control indicator may be received via a wired or wireless communication interface. This communication interface may communicatively couple the electronics at the traffic control indicator to a computer that controls operation of configurable traffic control indicators along a roadway. This control computer may be a computer of an information distribution network that controls operation of radar enabled traffic control indicators. In one instance, electronics at the traffic control indicator may receive configuration information via a cellular network that sends wireless signals to traffic control indicators. The configuration information may include text that should be displayed on a display such that drivers can receive advisory, or warning information and this configuration information may also control data that should be sent to a radar device of an AV, such as AV 110 of FIG. 1.

At block 220, operation of the traffic control indicator may be initiated according to the configuration information received at block 210. When the traffic control indicator is in operation, it may display text on a display, radar signal manipulation functions of the radar signal may be performed, or the traffic control indicator may both display text and perform signal manipulation functions. At block 230, a radar signal may be received that was transmitted by a radar device of an AV. A velocity component and possibly message data may be added to the received radar signal at block 240 when an updated radar signal in generated.

The updated radar signal may then be transmitted from the electronics of the traffic control indicator to a radar device of an AV at block 250. The radar device at the AV may then process the signal sent from the traffic control indicator radar apparatus based on that signal including the velocity component added at block 240. The velocity component may be added to force the AV radar device to extract data from the signal. This may be true because at least some radar devices are configured not to process received radar signals that do not include a velocity component. This velocity component may correspond to a timing or phase shift in radar waveforms. These timing or phase shifts makes it appear as though the traffic control indicator is moving, even when it is not. As such, the velocity component may be a "false" or "faked" indication that forces radar devices of AVs to evaluate. While not illustrated in FIG. 2, block 240 may also include adding message data to the radar signal.

Functions performed by the AV radar device may result in message data being extracted from the updated radar signal and may result in the AV performing tasks consistent with the message data added to the updated radar signal. Data extracted from a radar signal sent from the traffic control indicator radar apparatus may allow the AV to receive and act upon message data included in the radar signal sent from the AV radar device. For example, the AV may turn on four-wheel drive of the vehicle, the AV may avoid a closed lane, or the AV may drive in a lane typically reserved for traffic traveling in the opposite direction when a roadway is under construction. In such an instance, the traffic control indicator may include text that instruct drivers when to drive on a lane typically reserved for travel in the opposite direction (e.g., red, yellow, and green lights). In this instance, information sent to the AV radar device in an updated radar signal may inform the AV to stop and wait. Later a subsequent updated radar signal sent from the traffic control indicator may instruct the AV to drive in the opposite direction lane. As such, an intelligent traffic control indicator may be deployed in circumstances when a single lane roadway is used to pass traffic safely in both directions.

Determination block 260 may identify whether updated traffic control indicator information has been received. Updates to traffic control indicator information may be associated with changing conditions along a roadway. For example, a first configuration of the traffic control indicator may include instructions to avoid driving in a particular roadway lane when that lane is blocked by an accident. Such a message may instruct the AV not to drive in the lane where the accident occurred. Later when conditions associated with the accident have improved, accident warning information sent to AV radar devices may indicate that the previously closed lane can be used at a speed that is less than the speed limit. When the traffic control indicator has not received updated road configuration information, program flow may move back to block 230 where additional radar signals may be received from vehicle radar devices.

When determination block 260 identifies that the traffic control indicator configuration has been updated, program flow may move to determination block 270. Determination block 270 may identify whether the update is associated with ending operation of the traffic control indicator, when yes, operation of the traffic control indicator may end (be disabled) at block 280. When determination block 270 identifies that the traffic control indicator operation should not be ended, operation of the traffic control indicator may be updated according to the updated configuration information at block 220.

In this disclosure, a computer that controls operation of an AV may be referred to as an autonomous driving system computer (ADSC) or an AV controller. While not illustrated in FIG. 2, operation of an ADSC may result in data being received by the ADSC that authenticates the traffic control indicator or that informs the ADSC that intelligent traffic control indicators are operational at a given location. For example, the ADSC may be configured to receive information from a cellular or other wireless network that provides road condition information to the ADSC. In such an instance, data sent via a wireless network to the ADSC may indicate locations where intelligent traffic control indicators may be active. The ADSC may receive information identifying that radar enabled traffic control indicators are located East of Auburn California and West of Reno Nevada on US Highway 80 when heavy snow is falling in the Sierra Nevada mountains. When such information is received by an ADSC that is driving near the area where the heavy snow is falling, the ADSC may be configured to control operation of an AV based on messages received from radar enabled traffic control indicators. In such an instance, the ADSC may use global positioning system (GPS) information to identify when the AV enters this heavy snow condition area. Because of this, an ADSC may be able to validate whether data from a particular intelligent traffic control indicator can be trusted.

FIG. 3 illustrates an example process where a radar device at a traffic control indicator receives, updates, and rebroadcasts radar signals. A radar signal transmitted from an AV radar device may be received at block 310. This received radar signal may include a carrier signal and a sub-carrier signal as discussed with respect to FIG. 1. The sub-carrier signal may be superimposed onto the carrier signal where the carrier signal may have frequency in the radar spectrum. The sub-carrier signal may have a frequency in the radio spectrum. Here again the carrier signal may have a frequency of 77 GHz and the sub-carrier signal may have a frequency of 10 MHz.

Once the radar signal is received by the radar apparatus at a traffic control indicator, the sub-carrier frequency signal may be extracted from the carrier signal at block 320. The process of separating a sub-carrier signal from a carrier signal may be referred to as a downmixing process. Such a down-mixing process may be implemented by a set of electronics that reside at a radar enabled road.

At block 330, another set of electronics at the traffic control indicator may encode data into the sub-carrier signal output by a down-mixing circuit. As mentioned above, this encoded data may include a velocity component and possibly message data. Here again the data encoded into the sub-carrier frequency signal may be encoded by shifting phases of or frequency modulating of at least a portion of the sub-carrier frequency signal, such as Doppler shift and phase shift. The phase component may be encoded using an appropriate schema dependent on the amount of information to be transmitted. The resulting sub-carrier signal is an updated signal that may have the 10 MHz signal discussed above.

In order to generate a new radar signal, a signal generated by an oscillator may be combined or mixed with the updated sub-carrier signal. This may include mixing the updated 10 MHz sub-carrier signal with a 77 GHz signal from the oscillator. This mixing function may be performed by a set of electronics (e.g., analog electronics) at the traffic control indicator. This may be referred to as mixing the encoded sub-carrier frequency signal with the signal generated by the oscillator. This means that the outgoing radar signal may have a carrier frequency that is the same frequency as the carrier frequency of the radar signal received at block 310. The only difference between the radar signal received at block 310 and the outgoing radar signal generated at block 340 may be that the outgoing radar signal will include the velocity component and possibly other data that the received radar signal does not include. Once or as the outgoing radar signal is generated, the outgoing radar signal may be transmitted for receipt by the radar device at the AV at block 350.

While not illustrated in FIG. 3, the radar device at the AV may receive the radar signal transmitted by the traffic control indicator radar apparatus, may separate the sub-carrier signal from the carrier signal, and may extract message data encoded into the sub-carrier signal. The AV radar device may provide this message data to an AV controller of the AV such that the AV controller may interpret and act upon that extracted message data.

Figure 4:
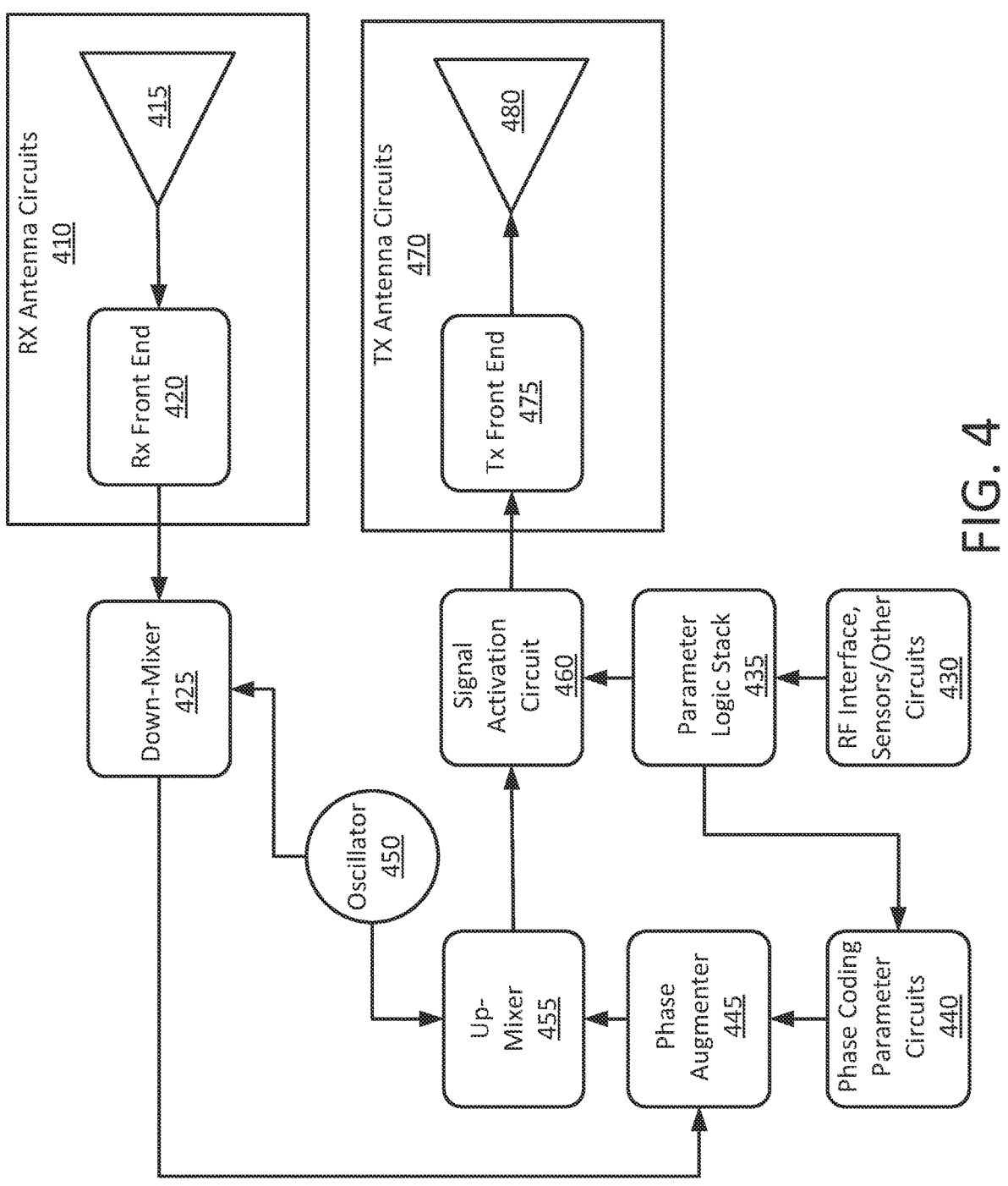
FIG. 4 illustrates an example of a radar system that can be used to receive, modify, and rebroadcast modified radar signals to a radar receiver, such as a radar receive of an AV, according to some aspects of the subject technology.

FIG. 4 illustrates examples of circuits that may be included in a traffic control indicator that processes received radar signals, encodes data into the received radar signals, and transmits updated radar signals that include the encoded data. FIG. 4 includes a set of receiving (RX) antenna circuits 410 that include antenna 415 and receiving (RX) front end circuit 420. RX front end circuit 420 may include filtering components and/or components that amplify received radar signals. A signal received by antenna 415 may be filtered and/or amplified by RX front end circuit 420 and then the filtered/amplified signal may be provided to down-mixing circuit 425. Signals received by antenna 415 may be radar signals that include a sub-carrier signal embedded into/superimposed onto a carrier signal as discussed in respect to FIGS. 1-3. Radar signals received by antenna 415 may have been transmitted by a radar device of an autonomous vehicle (AV). Down-mixing circuit 425 may receive a signal from RX front end circuit 420 and may receive another signal from oscillator 450. The signal received from oscillator 450 may have the same frequency as the carrier signal received by antenna 415. As such, down-mixing circuit 425 may process signals in the analog domain (analog signal processing) without need to perform signal processing with a processor.

While not illustrated in FIG. 4, oscillator 450 may include a phase locked loop that allows oscillator 450 to adjust to a frequency and phase of a signal. The signal provided from oscillator 450 may allow down-mixing circuit 425 to extract the sub-carrier signal from the carrier signal using analog signal processing techniques. A signal output from down-mixing circuit 425 may be provided to phase augmenter circuit 445. Phase augmenter circuit 445 may be used to induce phase changes to encode a velocity component and possibly message data into a signal received from down-mixing circuit 425.

FIG. 4 also includes a set of circuits 430 that may include one or more of a communication interface, sensors, sensing circuits, a memory, and/or a processor that executes instructions out of the memory. A communication interface included in the set of circuits 430 may be configured to receive radio frequency (RF) signals. For example, a communication interface may receive fifth generation (5G) cellular signals. Wireless communication signals that were transmitted from a control computer (not illustrated in FIG. 4) may include data that controls operation of an intelligent/radar enabled traffic control indicator. Data received via the communication interface may identify one or more of: information that should be displayed on the traffic control indicator, information that should be sent to radar devices using encoded radar signals, or information that identifies conditions associated with a roadway (e.g., weather conditions). Data received via circuits 430 may be used to populate parameters stored at parameter logic stack 435. When circuits 430 include a memory and a processor, the processor may execute instructions out of the memory to extract data included in a transmission from the control computer. Data extracted from such a transmission may include weather information used to configure parameters of an intelligent traffic control indicator. The control computer that sends configuration information to radar enabled traffic control indicators may be located at a location that is far from the radar enabled traffic control indicators that the control computer controls. This control computer may be part of a roadway control system that controls the operation of traffic control indicators throughout a region (e.g., a state, city, or county).

When sensors are included in the set of circuits 430, these sensors may sense weather condition data at a location where the traffic control indicator is located. Such sensor data may be received by a processor that may evaluate received sensor data to identify whether it is raining or snowing in the location where the traffic control indicator is located. When the processor identifies that weather conditions where the traffic control indicator is located could interfere with radar transmissions, the processor may increase a power level used to transmit radar signals from a radar apparatus of the traffic control indicator. For example, when the sensor data indicates that rain or snow is falling where the traffic control indicator is located, the power level used to transmit radar signals from the electronics of the traffic control indicator may be increased. When such inclement weather conditions no longer exist, the processor may reduce the power level used to transmit radar signals from the traffic control indicator radar apparatus. Determinations made based on received sensor data may also result in weather parameters being updated at the parameter logic stack 435. Parameters stored at weather parameter logic stack 435 may be stored in a memory or in a set of registers. As such, parameters stored at parameter logic stack 435 may include configuration data, may identify message data that should be transmitted to AV radar devices, or may identify power levels that should be used to transmit radar signals given certain weather conditions.

These parameters may also identify when operation of electronics at the traffic control indicator should be active. When operation of the electronics of the traffic control indicator should be initiated, signal activation circuit 460 may be set in an active state based on data stored at parameter logic stack 435. Data stored at the parameter logic stack may also provide data to phase coding parameter circuits 440. Phase coding parameter circuits 440 may include a shift register that controls operation of phase augmenter circuit 445. Specific bit patterns stored at this shift register may correspond to phase shifts that will be merged into a signal received from down-mixer circuit 425. Phase augmenter circuit 445 may create the updated subcarrier signal discussed in respect to FIG. 3. Output from the phase augmenter circuit 445 may be provided to up-mixer circuit 455 that receives a signal at the carrier frequency from oscillator 450. Up-mixer circuit 455 may combine the encoded sub-carrier signal output by phase augmenter circuit 445 with the carrier signal output by oscillator 450 when generating an encoded radar signal, such as radar signal 180 of FIG. 1. Up-mixer circuit may include analog components that are controlled by digital components (e.g., phase coding parameter circuits 440 or a processor). Up-mixing circuit may mix signals using analog signal processing techniques that are controlled by digital components.

Once the radar signal is generated, it may be provided to TX Antenna circuits 470 via signal activation circuit 460. TX antenna circuits 470 may include TX front end circuit 475 and antenna 480. TX front end circuits may include an amplifier that has a gain that may be adjusted based on information stored at parameter logic stack 435. The radar signal generated at up-mixer circuit 455 may be transmitted from antenna 480 for receipt by an AV radar device.

Figure 5:
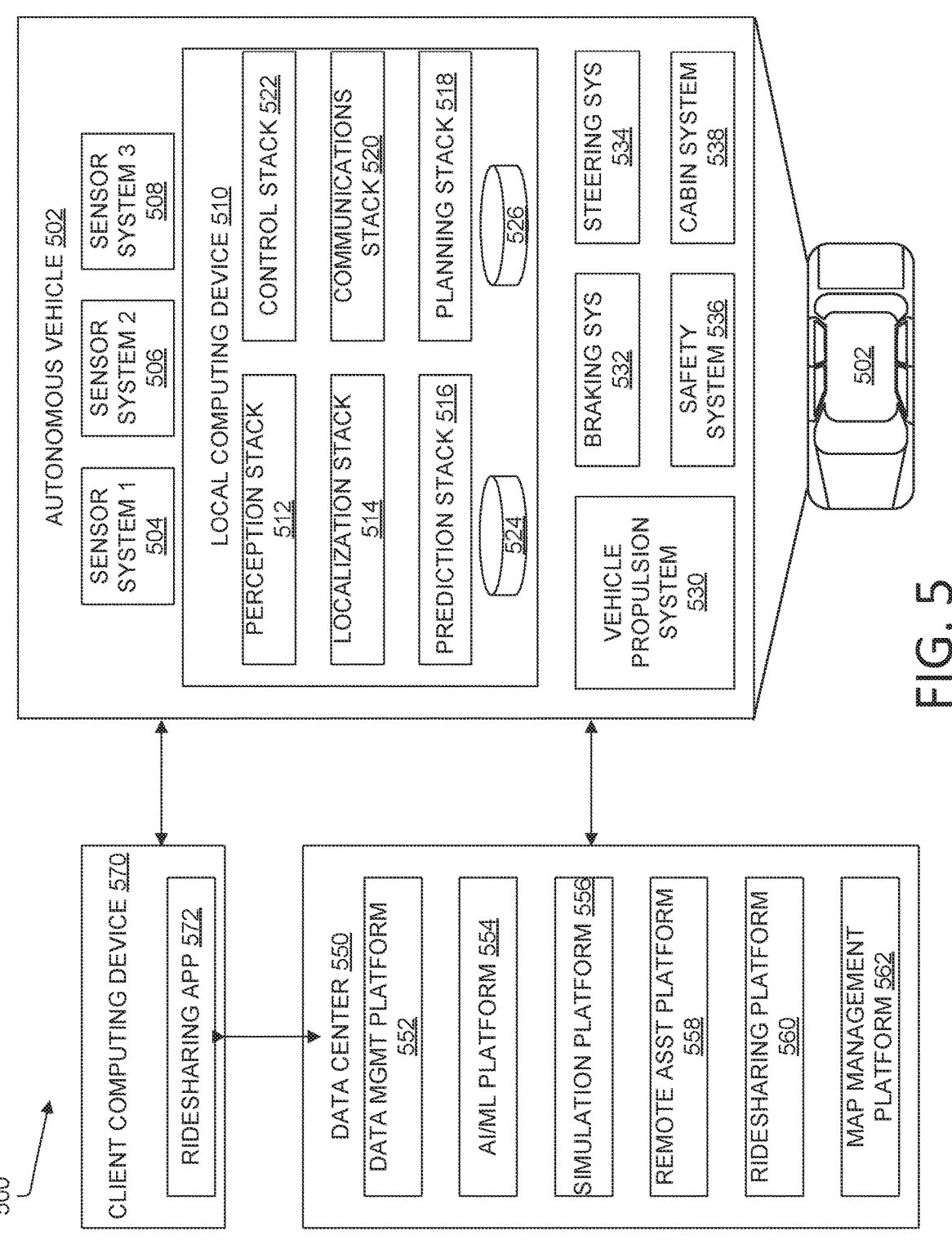
FIG. 5 illustrates an example system environment that can be used to facilitate AV dispatch and operations, according to some aspects of the disclosed technology.

FIG. 5 is a diagram illustrating an example autonomous vehicle (AV) environment 500, according to some examples of the present disclosure. One of ordinary skill in the art will understand that, for the AV management environment 500 and any system discussed in the present disclosure, there can be additional or fewer components in similar or alternative configurations. The illustrations and examples provided in the present disclosure are for conciseness and clarity. Other examples may include different numbers and/or types of elements, but one of ordinary skill the art will appreciate that such variations do not depart from the scope of the present disclosure.

In this example, the AV management environment 500 includes an AV 502, a data center 550, and a client computing device 570. The AV 502, the data center 550, and the client computing device 570 can communicate with one another over one or more networks (not shown), such as a public network (e.g., the Internet, an Infrastructure as a Service (IaaS) network, a Platform as a Service (PaaS) network, a Software as a Service (SaaS) network, other Cloud Service Provider (CSP) network, etc.), a private network (e.g., a Local Area Network (LAN), a private cloud, a Virtual Private Network (VPN), etc.), and/or a hybrid network (e.g., a multi-cloud or hybrid cloud network, etc.).

The AV 502 can navigate roadways without a human driver based on sensor signals generated by multiple sensor systems, such as sensor systems 504, 506, and 508. The sensor systems 504-508 can include one or more types of sensors and can be arranged about the AV 502. For instance, the sensor systems 504-508 can include Inertial Measurement Units (IMUs), cameras (e.g., still image cameras, video cameras, etc.), light sensors (e.g., LIDAR systems, ambient light sensors, infrared sensors, etc.), RADAR systems, GPS receivers, audio sensors (e.g., microphones, Sound Navigation and Ranging (SONAR) systems, ultrasonic sensors, etc.), engine sensors, speedometers, tachometers, odometers, altimeters, tilt sensors, impact sensors, airbag sensors, seat occupancy sensors, open/closed door sensors, tire pressure sensors, rain sensors, and so forth. For example, the sensor system 504 can be a camera system, the sensor system 506 can be a LIDAR system, and the sensor system 508 can be a RADAR system. Other examples may include any other number and type of sensors.

The AV 502 can also include several mechanical systems that can be used to maneuver or operate the AV 502. For instance, the mechanical systems can include a vehicle propulsion system 530, a braking system 532, a steering system 534, a safety system 536, and a cabin system 538, among other systems. The vehicle propulsion system 530 can include an electric motor, an internal combustion engine, or both. The braking system 532 can include an engine brake, brake pads, actuators, and/or any other suitable componentry configured to assist in decelerating the AV 502. The steering system 534 can include suitable componentry configured to control the direction of movement of the AV 502 during navigation. The safety system 536 can include lights and signal indicators, a parking brake, airbags, and so forth. The cabin system 538 can include cabin temperature control systems, in-cabin entertainment systems, and so forth. In some examples, the AV 502 might not include human driver actuators (e.g., steering wheel, handbrake, foot brake pedal, foot accelerator pedal, turn signal lever, window wipers, etc.) for controlling the AV 502. Instead, the cabin system 538 can include one or more client interfaces (e.g., Graphical User Interfaces (GUIs), Voice User Interfaces (VUIs), etc.) for controlling certain aspects of the mechanical systems 530-538.

The AV 502 can include a local computing device 510 that is in communication with the sensor systems 504-508, the mechanical systems 530-538, the data center 550, and the client computing device 570, among other systems. The local computing device 510 can include one or more processors and memory, including instructions that can be executed by the one or more processors. The instructions can make up one or more software stacks or components responsible for controlling the AV 502; communicating with the data center 550, the client computing device 570, and other systems; receiving inputs from riders, passengers, and other entities within the AV's environment; logging metrics collected by the sensor systems 504-508; and so forth. In this example, the local computing device 510 includes a perception stack 512, a mapping and localization stack 514, a prediction stack 516, a planning stack 518, a communications stack 520, a control stack 522, an AV operational database 524, and an HD geospatial database 526, among other stacks and systems.

The perception stack 512 can enable the AV 502 to "see" (e.g., via cameras, LIDAR sensors, infrared sensors, etc.), "hear" (e.g., via microphones, ultrasonic sensors, RADAR, etc.), and "feel" (e.g., pressure sensors, force sensors, impact sensors, etc.) its environment using information from the sensor systems 504-508, the mapping and localization stack 514, the HD geospatial database 526, other components of the AV, and other data sources (e.g., the data center 550, the client computing device 570, third party data sources, etc.). The perception stack 512 can detect and classify objects and determine their current locations, speeds, directions, and the like. In addition, the perception stack 512 can determine the free space around the AV 502 (e.g., to maintain a safe distance from other objects, change lanes, park the AV, etc.). The perception stack 512 can identify environmental uncertainties, such as where to look for moving objects, flag areas that may be obscured or blocked from view, and so forth. In some examples, an output of the prediction stack can be a bounding area around a perceived object that can be associated with a semantic label that identifies the type of object that is within the bounding area, the kinematic of the object (information about its movement), a tracked path of the object, and a description of the pose of the object (its orientation or heading, etc.).

The mapping and localization stack 514 can determine the AV's position and orientation (pose) using different methods from multiple systems (e.g., GPS, IMUs, cameras, LIDAR, RADAR, ultrasonic sensors, the HD geospatial database 526, etc.). For example, in some cases, the AV 502 can compare sensor data captured in real-time by the sensor systems 504-508 to data in the HD geospatial database 526 to determine its precise (e.g., accurate to the order of a few centimeters or less) position and orientation. The AV 502 can focus its search based on sensor data from one or more first sensor systems (e.g., GPS) by matching sensor data from one or more second sensor systems (e.g., LIDAR). If the mapping and localization information from one system is unavailable, the AV 502 can use mapping and localization information from a redundant system and/or from remote data sources.

The prediction stack 516 can receive information from the localization stack 514 and objects identified by the perception stack 512 and predict a future path for the objects. In some examples, the prediction stack 516 can output several likely paths that an object is predicted to take along with a probability associated with each path. For each predicted path, the prediction stack 516 can also output a range of points along the path corresponding to a predicted location of the object along the path at future time intervals along with an expected error value for each of the points that indicates a probabilistic deviation from that point.

The planning stack 518 can determine how to maneuver or operate the AV 502 safely and efficiently in its environment. For example, the planning stack 518 can receive the location, speed, and direction of the AV 502, geospatial data, data regarding objects sharing the road with the AV 502 (e.g., pedestrians, bicycles, vehicles, ambulances, buses, cable cars, trains, traffic lights, lanes, road markings, etc.) or certain events occurring during a trip (e.g., emergency vehicle blaring a siren, intersections, occluded areas, street closures for construction or street repairs, double-parked cars, etc.), traffic rules and other safety standards or practices for the road, user input, and other relevant data for directing the AV 502 from one point to another and outputs from the perception stack 512, localization stack 514, and prediction stack 516. The planning stack 518 can determine multiple sets of one or more mechanical operations that the AV 502 can perform (e.g., go straight at a specified rate of acceleration, including maintaining the same speed or decelerating; turn on the left blinker, decelerate if the AV is above a threshold range for turning, and turn left; turn on the right blinker, accelerate if the AV is stopped or below the threshold range for turning, and turn right; decelerate until completely stopped and reverse; etc.), and select the best one to meet changing road conditions and events. If something unexpected happens, the planning stack 518 can select from multiple backup plans to carry out. For example, while preparing to change lanes to turn right at an intersection, another vehicle may aggressively cut into the destination lane, making the lane change unsafe. The planning stack 518 could have already determined an alternative plan for such an event. Upon its occurrence, it could help direct the AV 502 to go around the block instead of blocking a current lane while waiting for an opening to change lanes.

The control stack 522 can manage the operation of the vehicle propulsion system 530, the braking system 532, the steering system 534, the safety system 536, and the cabin system 538. The control stack 522 can receive sensor signals from the sensor systems 504-508 as well as communicate with other stacks or components of the local computing device 510 or a remote system (e.g., the data center 550) to effectuate operation of the AV 502. For example, the control stack 522 can implement the final path or actions from the multiple paths or actions provided by the planning stack 518. This can involve turning the routes and decisions from the planning stack 518 into commands for the actuators that control the AV's steering, throttle, brake, and drive unit.

The communications stack 520 can transmit and receive signals between the various stacks and other components of the AV 502 and between the AV 502, the data center 550, the client computing device 570, and other remote systems. The communications stack 520 can enable the local computing device 510 to exchange information remotely over a network, such as through an antenna array or interface that can provide a metropolitan WIFI network connection, a mobile or cellular network connection (e.g., Third Generation (3G), Fourth Generation (4G), Long-Term Evolution (LTE), 5th Generation (5G), etc.), and/or other wireless network connection (e.g., License Assisted Access (LAA), Citizens Broadband Radio Service (CBRS), MULTEFIRE, etc.). The communications stack 520 can also facilitate the local exchange of information, such as through a wired connection (e.g., a user's mobile computing device docked in an in-car docking station or connected via Universal Serial Bus (USB), etc.) or a local wireless connection (e.g., Wireless Local Area Network (WLAN), Bluetooth®, infrared, etc.).

The HD geospatial database 526 can store HD maps and related data of the streets upon which the AV 502 travels. In some examples, the HD maps and related data can comprise multiple layers, such as an areas layer, a lanes and boundaries layer, an intersections layer, a traffic controls layer, and so forth. The areas layer can include geospatial information indicating geographic areas that are drivable (e.g., roads, parking areas, shoulders, etc.) or not drivable (e.g., medians, sidewalks, buildings, etc.), drivable areas that constitute links or connections (e.g., drivable areas that form the same road) versus intersections (e.g., drivable areas where two or more roads intersect), and so on. The lanes and boundaries layer can include geospatial information of road lanes (e.g., lane centerline, lane boundaries, type of lane boundaries, etc.) and related attributes (e.g., direction of travel, speed limit, lane type, etc.). The lanes and boundaries layer can also include three-dimensional (3D) attributes related to lanes (e.g., slope, elevation, curvature, etc.). The intersections layer can include geospatial information of intersections (e.g., crosswalks, stop lines, turning lane centerlines and/or boundaries, etc.) and related attributes (e.g., permissive, protected/permissive, or protected only left turn lanes; legal or illegal U-turn lanes; permissive or protected only right turn lanes; etc.). The traffic controls lane can include geospatial information of traffic signal lights, traffic signs, and other road objects and related attributes.

The AV operational database 524 can store raw AV data generated by the sensor systems 504-508, stacks 512-522, and other components of the AV 502 and/or data received by the AV 502 from remote systems (e.g., the data center 550, the client computing device 570, etc.). In some examples, the raw AV data can include HD LIDAR point cloud data, image data, RADAR data, GPS data, and other sensor data that the data center 550 can use for creating or updating AV geospatial data or for creating simulations of situations encountered by AV 502 for future testing or training of various machine learning algorithms that are incorporated in the local computing device 510.

The data center 550 can include a private cloud (e.g., an enterprise network, a co-location provider network, etc.), a public cloud (e.g., an Infrastructure as a Service (IaaS) network, a Platform as a Service (PaaS) network, a Software as a Service (SaaS) network, or other Cloud Service Provider (CSP) network), a hybrid cloud, a multi-cloud, and/or any other network. The data center 550 can include one or more computing devices remote to the local computing device 510 for managing a fleet of AVs and AV-related services. For example, in addition to managing the AV 502, the data center 550 may also support a ridesharing service, a delivery service, a remote/roadside assistance service, street services (e.g., street mapping, street patrol, street cleaning, street metering, parking reservation, etc.), and the like.

The data center 550 can send and receive various signals to and from the AV 502 and the client computing device 570. These signals can include sensor data captured by the sensor systems 504-508, roadside assistance requests, software updates, ridesharing pick-up and drop-off instructions, and so forth. In this example, the data center 550 includes a data management platform 552, an Artificial Intelligence/Machine Learning (AI/ML) platform 554, a simulation platform 556, a remote assistance platform 558, and a ridesharing platform 560, and a map management platform 562, among other systems.

The data management platform 552 can be a "big data" system capable of receiving and transmitting data at high velocities (e.g., near real-time or real-time), processing a large variety of data and storing large volumes of data (e.g., terabytes, petabytes, or more of data). The varieties of data can include data having different structures (e.g., structured, semi-structured, unstructured, etc.), data of different types (e.g., sensor data, mechanical system data, ridesharing service, map data, audio, video, etc.), data associated with different types of data stores (e.g., relational databases, key-value stores, document databases, graph databases, column-family databases, data analytic stores, search engine databases, time series databases, object stores, file systems, etc.), data originating from different sources (e.g., AVs, enterprise systems, social networks, etc.), data having different rates of change (e.g., batch, streaming, etc.), and/or data having other characteristics. The various platforms and systems of the data center 550 can access data stored by the data management platform 552 to provide their respective services.

The AI/ML platform 554 can provide the infrastructure for training and evaluating machine learning algorithms for operating the AV 502, the simulation platform 556, the remote assistance platform 558, the ridesharing platform 560, the map management platform 562, and other platforms and systems. Using the AI/ML platform 554, data scientists can prepare data sets from the data management platform

552; select, design, and train machine learning models; evaluate, refine, and deploy the models; maintain, monitor, and retrain the models; and so on.

The simulation platform 556 can enable testing and validation of the algorithms, machine learning models, neural networks, and other development efforts for the AV 502, the remote assistance platform 558, the ridesharing platform 560, the map management platform 562, and other platforms and systems. The simulation platform 556 can replicate a variety of driving environments and/or reproduce real-world scenarios from data captured by the AV 502, including rendering geospatial information and road infrastructure (e.g., streets, lanes, crosswalks, traffic lights, stop signs, etc.) obtained from a cartography platform (e.g., map management platform 562); modeling the behavior of other vehicles, bicycles, pedestrians, and other dynamic elements; simulating inclement weather conditions, different traffic scenarios; and so on.

The remote assistance platform 558 can generate and transmit instructions regarding the operation of the AV 502. For example, in response to an output of the AI/ML platform 554 or other system of the data center 550, the remote assistance platform 558 can prepare instructions for one or more stacks or other components of the AV 502.

The ridesharing platform 560 can interact with a customer of a ridesharing service via a ridesharing application 572 executing on the client computing device 570. The client computing device 570 can be any type of computing system such as, for example and without limitation, a server, desktop computer, laptop computer, tablet computer, smartphone, smart wearable device (e.g., smartwatch, smart eyeglasses or other Head-Mounted Display (HMD), smart ear pods, or other smart in-ear, on-ear, or over-ear device, etc.), gaming system, or any other computing device for accessing the ridesharing application 572. The client computing device 570 can be a customer's mobile computing device or a computing device integrated with the AV 502 (e.g., the local computing device 510). The ridesharing platform 560 can receive requests to pick up or drop off from the ridesharing application 572 and dispatch the AV 502 for the trip.

Map management platform 562 can provide a set of tools for the manipulation and management of geographic and spatial (geospatial) and related attribute data. The data management platform 552 can receive LIDAR point cloud data, image data (e.g., still image, video, etc.), RADAR data, GPS data, and other sensor data (e.g., raw data) from one or more AVs 502, Unmanned Aerial Vehicles (UAVs), satellites, third-party mapping services, and other sources of geospatially referenced data. The raw data can be processed, and map management platform 562 can render base representations (e.g., tiles (2D), bounding volumes (3D), etc.) of the AV geospatial data to enable users to view, query, label, edit, and otherwise interact with the data. Map management platform 562 can manage workflows and tasks for operating on the AV geospatial data. Map management platform 562 can control access to the AV geospatial data, including granting or limiting access to the AV geospatial data based on user-based, role-based, group-based, task-based, and other attribute-based access control mechanisms. Map management platform 562 can provide version control for the AV geospatial data, such as to track specific changes that (human or machine) map editors have made to the data and to revert changes when necessary. Map management platform 562 can administer release management of the AV geospatial data, including distributing suitable iterations of the data to different users, computing devices, AVs, and other consumers of HD maps. Map management platform 562 can provide analytics regarding the AV geospatial data and related data, such as to generate insights relating to the throughput and quality of mapping tasks.

In some examples, the map viewing services of map management platform 562 can be modularized and deployed as part of one or more of the platforms and systems of the data center 550. For example, the AI/ML platform 554 may incorporate the map viewing services for visualizing the effectiveness of various object detection or object classification models, the simulation platform 556 may incorporate the map viewing services for recreating and visualizing certain driving scenarios, the remote assistance platform 558 may incorporate the map viewing services for replaying traffic incidents to facilitate and coordinate aid, the ridesharing platform 560 may incorporate the map viewing services into the client ridesharing application 572 to enable passengers to view the AV 502 en route (e.g., in transit) to a pick-up or drop-off location, and so on.

Figure 6:
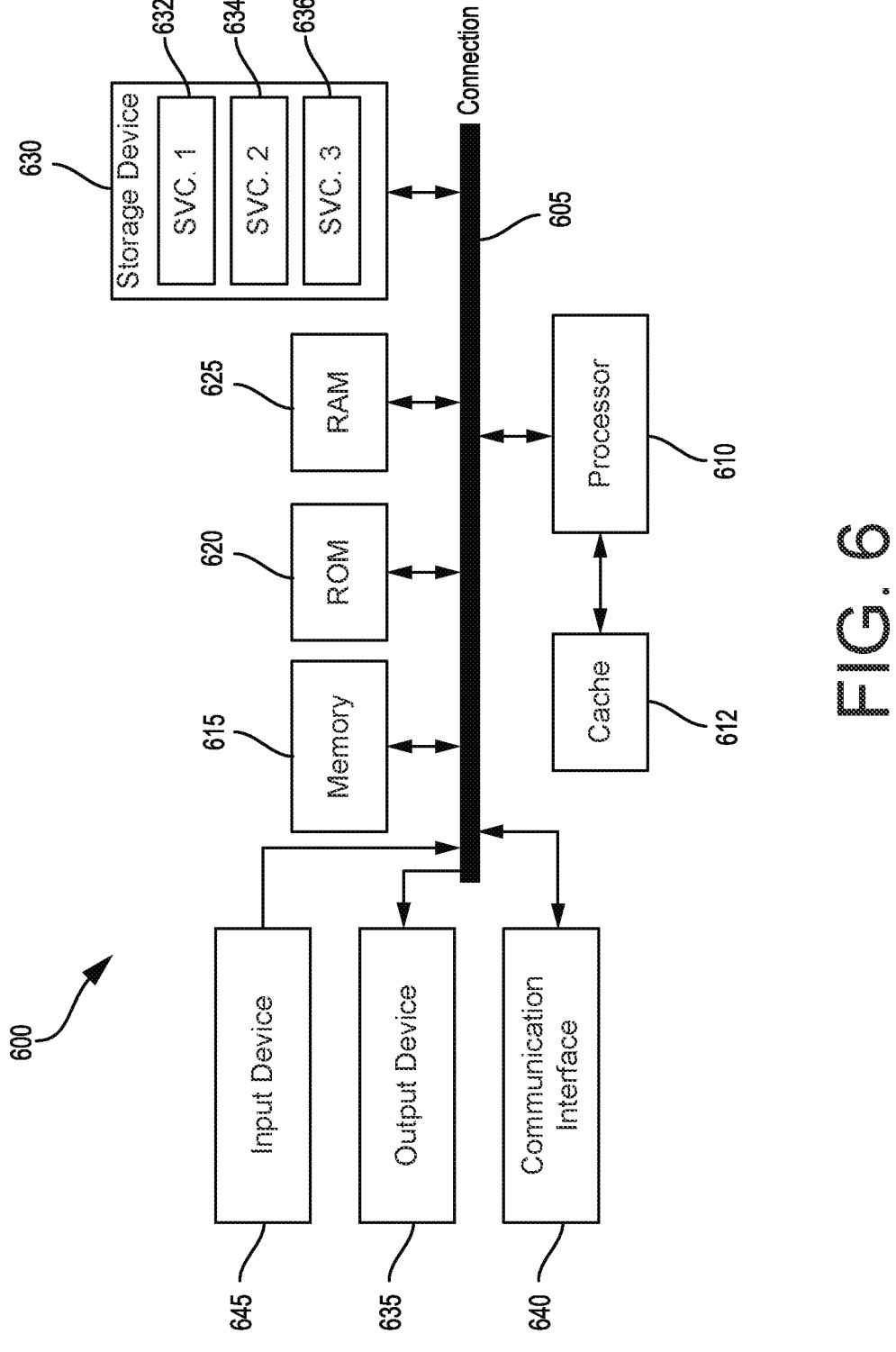
FIG. 6 illustrates an example processor-based system with which some aspects of the subject technology can be implemented.

FIG. 6 illustrates an example processor-based system with which some aspects of the subject technology can be implemented. For example, processor-based system 600 can be any computing device making up, or any component thereof in which the components of the system are in communication with each other using connection 605. Connection 605 can be a physical connection via a bus, or a direct connection into processor 610, such as in a chipset architecture. Connection 605 can also be a virtual connection, networked connection, or logical connection.

In some examples, computing system 600 is a distributed system in which the functions described in this disclosure can be distributed within a datacenter, multiple data centers, a peer network, etc. In some examples, one or more of the described system components represents many such components each performing some or all of the function for which the component is described. In some instances, the components can be physical or virtual devices.

Example system 600 includes at least one processing unit (Central Processing Unit (CPU) or processor) 610 and connection 605 that couples various system components including system memory 615, such as Read-Only Memory (ROM) 620 and Random-Access Memory (RAM) 625 to processor 610. Computing system 600 can include a cache of high-speed memory 612 connected directly with, in close proximity to, or integrated as part of processor 610.

Processor 610 can include any general-purpose processor and a hardware service or software service, such as services 632, 634, and 636 stored in storage device 630, configured to control processor 610 as well as a special-purpose processor where software instructions are incorporated into the actual processor design. Processor 610 may essentially be a completely self-contained computing system, containing multiple cores or processors, a bus, memory controller, cache, etc. A multi-core processor may be symmetric or asymmetric.

To enable user interaction, computing system 600 includes an input device 645, which can represent any number of input mechanisms, such as a microphone for speech, a touch-sensitive screen for gesture or graphical input, keyboard, mouse, motion input, speech, etc. Computing system 600 can also include output device 635, which can be one or more of a number of output mechanisms known to those of skill in the art. In some instances, multimodal systems can enable a user to provide multiple types of input/output to communicate with computing system 600. Computing system 600 can include communication interface 640, which can generally govern and manage the user input and system output. The communication interface may perform or facilitate receipt and/or transmission wired or wireless communications via wired and/or wireless transceivers, including those making use of an audio jack/plug, a microphone jack/plug, a Universal Serial Bus (USB) port/plug, an Apple® Lightning® port/plug, an Ethernet port/plug, a fiber optic port/plug, a proprietary wired port/plug, a BLUETOOTH® wireless signal transfer, a BLUETOOTH® low energy (BLE) wireless signal transfer, an IBEACON® wireless signal transfer, a Radio-Frequency Identification (RFID) wireless signal transfer, Near-Field Communications (NFC) wireless signal transfer, Dedicated Short Range Communication (DSRC) wireless signal transfer, 802.11 Wi-Fi® wireless signal transfer, Wireless Local Area Network (WLAN) signal transfer, Visible Light Communication (VLC) signal transfer, Worldwide Interoperability for Microwave Access (WiMAX), Infrared (IR) communication wireless signal transfer, Public Switched Telephone Network (PSTN) signal transfer, Integrated Services Digital Network (ISDN) signal transfer, 3G/4G/5G/LTE cellular data network wireless signal transfer, ad-hoc network signal transfer, radio wave signal transfer, microwave signal transfer, infrared signal transfer, visible light signal transfer signal transfer, ultraviolet light signal transfer, wireless signal transfer along the electromagnetic spectrum, or some combination thereof.

Communication interface 640 may also include one or more Global Navigation Satellite System (GNSS) receivers or transceivers that are used to determine a location of the computing system 600 based on receipt of one or more signals from one or more satellites associated with one or more GNSS systems. GNSS systems include, but are not limited to, the US-based Global Positioning System (GPS), the Russia-based Global Navigation Satellite System (GLONASS), the China-based BeiDou Navigation Satellite System (BDS), and the Europe-based Galileo GNSS. There is no restriction on operating on any particular hardware arrangement, and therefore the basic features here may easily be substituted for improved hardware or firmware arrangements as they are developed.

Storage device 630 can be a non-volatile and/or non-transitory and/or computer-readable memory device and can be a hard disk or other types of computer readable media which can store data that are accessible by a computer, such as magnetic cassettes, flash memory cards, solid state memory devices, digital versatile disks, cartridges, a floppy disk, a flexible disk, a hard disk, magnetic tape, a magnetic strip/stripe, any other magnetic storage medium, flash memory, memristor memory, any other solid-state memory, a Compact Disc (CD) Read Only Memory (CD-ROM) optical disc, a rewritable CD optical disc, a Digital Video Disk (DVD) optical disc, a Blu-ray Disc (BD) optical disc, a holographic optical disk, another optical medium, a Secure Digital (SD) card, a micro SD (microSD) card, a Memory Stick® card, a smartcard chip, a EMV chip, a Subscriber Identity Module (SIM) card, a mini/micro/nano/pico SIM card, another Integrated Circuit (IC) chip/card, Random-Access Memory (RAM), Static RAM (SRAM), Dynamic RAM (DRAM), Read-Only Memory (ROM), Programmable ROM (PROM), Erasable PROM (EPROM), Electrically Erasable PROM (EEPROM), flash EPROM (FLASHEPROM), cache memory (L1/L2/L3/L4/L5/L #), Resistive RAM (RRAM/ReRAM), Phase Change Memory (PCM), Spin Transfer Torque RAM (STT-RAM), another memory chip or cartridge, and/or a combination thereof.

Storage device 630 can include software services, servers, services, etc., that when the code that defines such software is executed by the processor 610, it causes the system 600 to perform a function. In some instances, a hardware service that performs a particular function can include the software component stored in a computer-readable medium in connection with the necessary hardware components, such as processor 610, connection 605, output device 635, etc., to carry out the function.

Aspects and examples within the scope of the present disclosure may also include tangible and/or non-transitory computer-readable storage media or devices for carrying or having computer-executable instructions or data structures stored thereon. Such tangible computer-readable storage devices can be any available device that can be accessed by a general purpose or special purpose computer, including the functional design of any special purpose processor as described above. By way of example, and not limitation, such tangible computer-readable devices can include RAM, ROM, EEPROM, CD-ROM or other optical disk storage, magnetic disk storage or other magnetic storage devices, or any other device which can be used to carry or store desired program code in the form of computer-executable instructions, data structures, or processor chip design. When information or instructions are provided via a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable storage devices.

Computer-executable instructions include, for example, instructions and data which cause a general-purpose computer, special purpose computer, or special purpose processing device to perform a certain function or group of functions. Computer-executable instructions also include program modules that are executed by computers in stand-alone or network environments. Generally, program modules include routines, programs, components, data structures, objects, and the functions inherent in the design of special-purpose processors, etc. that perform tasks or implement abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Other examples of the disclosure may be practiced in network computing environments with many types of computer system configurations, including personal computers, hand-held devices, multi-processor systems, microprocessor-based or programmable consumer electronics, network Personal Computers (PCs), minicomputers, mainframe computers, and the like. Aspects and examples of the disclosure may also be practiced in distributed computing environments where tasks are performed by local and remote processing devices that are linked (either by hardwired links, wireless links, or by a combination thereof) through a communications network. In a distributed computing environment, program modules may be located in both local and remote memory storage devices.

Claim language or other language in the disclosure reciting "at least one of" a set and/or "one or more" of a set indicates that one member of the set or multiple members of the set (in any combination) satisfy the claim. For example, claim language reciting "at least one of A and B" or "at least one of A or B" means A, B, or A and B. In another example, claim language reciting "at least one of A, B, and C" or "at least one of A, B, or C" means A, B, C, or A and B, or A and C, or B and C, or A and B and C. The language "at least one of" a set and/or "one or more" of a set does not limit the set to the items listed in the set. For example, claim language reciting "at least one of A and B" or "at least one of A or B" can mean A, B, or A and B, and can additionally include items not listed in the set of A and B.

Illustrative aspects of the disclosure include:

Aspect 1. An apparatus comprising: a traffic control indicator; and a radar module coupled to the traffic control indicator, wherein the radar module is configured to: receive a radar signal; and process the radar signal to generate an updated radar signal, the updated radar signal comprising at least one of a velocity component or message data. The radar module may also be configured to transmit the updated radar signal.

Aspect 2: The apparatus of Aspect 1, wherein the radar module is further configured to induce a phase change in at least a portion of the radar signal.

Aspect 3: The apparatus of any of Aspects 1 to 2, wherein the phase change in the at least portion of the radar signal encode the at least one of the velocity component or the message into the updated radar signal.

Aspect 4: The apparatus of any of Aspects 1 to 3, wherein the message data comprises weather data for an environment in proximity to the traffic control indicator.

Aspect 5: The apparatus of any of Aspects 1 to 4, wherein a weather condition of an area where the traffic control indicator is located is identified, and a power level to transmit the updated radar signal is set based on the weather condition of the area where the traffic control indicator is located.

Aspect 6: The apparatus of any of Aspects 1 to 5, wherein the weather condition is identified based on information included in a communication from an information distribution network.

Aspect 7: The apparatus of any of Aspects 1 to 6, further comprising a sensor that senses weather data in the area where the traffic control indicator is located.

Aspect 8: The apparatus of any of Aspects 1 to 7, further comprising a memory; and a processor, wherein the processor executes instructions out of the memory to: receive the weather data from the sensor and identify the weather condition based on the weather data.

Aspect 9: The apparatus of any of Aspects 1 to 8, further comprising a communication interface that receives a communication that identifies the message.

Aspect 10: The apparatus of any of Aspects 1 to 9, wherein the radar signal is received from a vehicle radar system.

Aspect 11: The apparatus of any of Aspects 1 to 10, wherein the message identifies a roadway advisory.

Aspect 12: The apparatus of claim 1, wherein the traffic control indicator is an emergency road sign.

Aspect 13: A method comprising receiving a radar signal at a traffic control indicator radar apparatus; and processing the radar signal to generate an updated radar signal, the updated radar signal comprising at least one of a velocity component or message data. This method may also include transmitting the updated radar signal from the traffic control indicator radar apparatus.

Aspect 14: The method of Aspect 13, further comprising configuring the traffic control indicator radar apparatus to induce a phase change in at least a portion of the radar signal.

Aspect 15: The method of any of Aspects 13 to 14, wherein the phase change induced into the at least portion of the radar signal encode the at least one of the velocity component or the message into the updated radar signal.

Aspect 16: The method of any of Aspects 13 to 15, wherein the message data comprises weather data for an environment in proximity to the traffic control indicator.

Aspect 17: The method of any of Aspects 13 to 16, further comprising identifying a weather condition in an area where the traffic control indicator is located; and setting a power level to transmit the updated radar signal based on the weather condition of the area where the traffic control indicator is located.

Aspect 18: The method of any of Aspects 13 to 17, wherein the weather condition is identified based on information included in a communication from an information distribution network.

Aspect 19: The method of any of Aspects 13 to 18, further comprising receiving sensor data from a sensor, wherein the weather condition is identified by a processor at that executes instructions out of a memory when performing an evaluation on the received sensor data.

Aspect 20: A non-transitory computer-readable storage medium having embodied thereon instructions that when executed by one or more processors initiate operation of a radar apparatus at a traffic control indicator to: receive a radar signal; and process the radar signal to generate an updated radar signal, the updated radar signal comprising at least one of a velocity component or message data. The updated radar signal may then be transmitted from the radar apparatus.

What is claimed is:

1. An apparatus comprising:
a traffic control indicator configured to convey driving instructions that regulate traffic; and
a radar module coupled to the traffic control indicator, wherein the radar module is configured to:
receive a radar signal;
process the radar signal to generate an updated radar signal, the updated radar signal comprising a false movement indicator configured to trigger a vehicle radar system to process the updated radar signal; and
transmit the updated radar signal for receipt by the vehicle radar system, thereby enabling the vehicle radar system to process the updated radar signal and extract message data comprising the driving instructions that regulate traffic.

2. The apparatus of claim 1, wherein the false movement indictor comprises a phase change in at least a portion of the radar signal.

3. The apparatus of claim 1, wherein the false movement indicator is configured to trigger the vehicle radar system by conveying a false indication that the traffic control indicator is moving.

4. The apparatus of claim 1, wherein the message data further comprises weather data for an environment in proximity to the traffic control indicator.

5. The apparatus of claim 1, wherein:
a weather condition of an area where the traffic control indicator is located is identified, and
a power level to transmit the updated radar signal is set based on the weather condition of the area where the traffic control indicator is located.

6. The apparatus of claim 5, wherein the weather condition is identified based on information included in a communication from an information distribution network.

7. The apparatus of claim 5, further comprising:
a sensor that senses weather data in the area where the traffic control indicator is located.

8. The apparatus of claim 7, further comprising:
a memory; and
a processor, wherein the processor executes instructions out of the memory to:
receive the weather data from the sensor, and identify the weather condition based on the weather data.

9. The apparatus of claim 1, further comprising a communication interface that receives a communication that identifies the message data.

10. The apparatus of claim 1, wherein the radar signal is received from athe vehicle radar system.

11. The apparatus of claim 1, wherein the message data identifies a roadway advisory.

12. The apparatus of claim 1, wherein the traffic control indicator is an emergency road sign.

13. A method comprising:
receiving a radar signal at a radar apparatus of a traffic control indicator, the traffic control indicator configured to convey driving instructions that regulate traffic;
processing the radar signal to generate an updated radar signal, the updated radar signal comprising a false movement indicator configured to trigger a vehicle radar system to process the updated radar signal; and
transmitting the updated radar signal from the traffic control indicator radar apparatus for receipt by the vehicle radar system, thereby enabling the vehicle radar system to process the updated radar signal and extract message data comprising the driving instructions that regulate traffic.

14. The method of claim 13, wherein the false movement indictor comprises a phase change in at least a portion of the radar signal.

15. The method of claim 13, wherein the false movement indicator is configured to trigger the vehicle radar system by conveying a false indication that the traffic control indicator is moving.

16. The method of claim 13, wherein the message data further comprises weather data for an environment in proximity to the traffic control indicator.

17. The method of claim 13, further comprising:
identifying a weather condition in an area where the traffic control indicator is located; and
setting a power level to transmit the updated radar signal based on the weather condition of the area where the traffic control indicator is located.

18. The method of claim 17, wherein the weather condition is identified based on information included in a communication from an information distribution network.

19. The method of claim 17, further comprising:
receiving sensor data from a sensor, wherein the weather condition is identified by a processor that executes instructions out of a memory when performing an evaluation on the received sensor data.

20. A non-transitory computer-readable storage medium having embodied thereon instructions that when executed by one or more processors:
initiate operation of a radar apparatus at a traffic control indicator configured to convey driving instructions that regulate traffic;
wherein the operations of the radar apparatus at the traffic control indicator are further configured to:

receive a radar signal;

process the radar signal to generate an updated radar signal, the updated radar signal comprising a false movement indicator configured to trigger a vehicle radar system to process the updated radar signal; and transmit the updated radar signal for receipt by the vehicle radar system, thereby enabling the vehicle radar system to process the updated radar signal and extract message data comprising the driving instructions that regulate traffic.

* * * * *